US012131858B2

(12) United States Patent
Nam et al.

(10) Patent No.: US 12,131,858 B2
(45) Date of Patent: Oct. 29, 2024

(54) TRANSFORMER

(71) Applicants: LG INNOTEK CO., LTD., Seoul (KR); INDUSTRY FOUNDATION OF CHONNAM NATIONAL UNIVERSITY, Gwangju (KR)

(72) Inventors: Taek Hoon Nam, Seoul (KR); Seok Yoon, Gwangju (KR); Yu Seon Kim, Seoul (KR); Seok Bae, Seoul (KR); Yeong Seog Lim, Gwangju (KR)

(73) Assignees: LG INNOTEK CO., LTD., Seoul (KR); INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 623 days.

(21) Appl. No.: 17/310,383

(22) PCT Filed: Jan. 30, 2020

(86) PCT No.: PCT/KR2020/001422
§ 371 (c)(1),
(2) Date: Jul. 29, 2021

(87) PCT Pub. No.: WO2020/159252
PCT Pub. Date: Aug. 6, 2020

(65) Prior Publication Data

US 2022/0093315 A1 Mar. 24, 2022

(30) Foreign Application Priority Data

Jan. 30, 2019 (KR) ........................ 10-2019-0011882
Jan. 30, 2019 (KR) ........................ 10-2019-0011883

(51) Int. Cl.
*H01F 27/28* (2006.01)
*H01F 27/24* (2006.01)
*H01F 27/32* (2006.01)

(52) U.S. Cl.
CPC ........... *H01F 27/24* (2013.01); *H01F 27/325* (2013.01)

(58) Field of Classification Search
CPC .......... H01F 27/24; H01F 27/325; H01F 3/14; H01F 27/2852; H01F 27/2866; H01F 27/306; H01F 27/2847
(Continued)

(56) References Cited

U.S. PATENT DOCUMENTS

2004/0257190 A1* 12/2004 Peck .................. H01F 27/2847 336/212
2009/0278648 A1* 11/2009 Teng .................. H01F 27/2866 336/199
(Continued)

FOREIGN PATENT DOCUMENTS

CN 203690047 U 7/2014
CN 104282422 A 1/2015
(Continued)

OTHER PUBLICATIONS

Office Action dated Nov. 10, 2023 in Korean Application No. 10-2019-0011882.
(Continued)

*Primary Examiner* — Shawki S Ismail
*Assistant Examiner* — Kazi S Hossain
(74) *Attorney, Agent, or Firm* — Saliwanchik, Lloyd & Eisenschenk

(57) ABSTRACT

The present invention relates to a transformer and, more specifically, to a transformer including a secondary coil portion on which a conductive plate is stacked. A transformer according to one embodiment of the present invention can comprise: a bobbin; a core portion coupled to the
(Continued)

bobbin along the outer side of the bobbin; and a plurality of conductive plates inserted into the bobbin and stacked in a thickness direction.

11 Claims, 11 Drawing Sheets

(58) Field of Classification Search
USPC ........................................... 336/221, 83, 198
See application file for complete search history.

(56) References Cited

U.S. PATENT DOCUMENTS

| | | | | |
|---|---|---|---|---|
| 2010/0188830 | A1* | 7/2010 | Tsai | H01F 27/2847 361/782 |
| 2010/0289607 | A1 | 11/2010 | Liu et al. | |
| 2011/0115598 | A1 | 5/2011 | Wu et al. | |
| 2012/0326831 | A1* | 12/2012 | Suzuki | H01F 27/263 336/233 |
| 2013/0278371 | A1* | 10/2013 | Hongzhong | H01F 27/2871 336/232 |
| 2014/0266537 | A1* | 9/2014 | Bichler | H01F 27/263 336/178 |

FOREIGN PATENT DOCUMENTS

| | | | | |
|---|---|---|---|---|
| CN | 105140007 | A * | 12/2015 | |
| CN | 105826056 | A * | 8/2016 | |
| DE | 202015101501 | U1 * | 5/2015 | H01F 27/28 |
| EP | 2 551 860 | A1 | 1/2013 | |
| JP | 2017-130613 | A | 7/2017 | |
| KR | 10-0782910 | B1 | 12/2007 | |
| KR | 10-1376930 | B1 | 3/2014 | |
| KR | 10-2016-0126141 | A | 11/2016 | |
| KR | 10-2017-0087696 | A | 7/2017 | |
| WO | 2019/245233 | A1 | 12/2019 | |

OTHER PUBLICATIONS

International Search Report dated May 13, 2020 in International Application No. PCT/KR2020/001422.
Supplementary European Search Report dated Oct. 20, 2022 in European Application No. 20747632.6.

* cited by examiner

TRANSFORMER

CROSS-REFERENCE TO RELATED APPLICATIONS

This application is the U.S. national stage application of International Patent Application No. PCT/KR2020/001422, filed Jan. 30, 2020, which claims the benefit under 35 U.S.C. § 119 of Korean Application Nos. 10-2019-0011882, filed Jan. 30, 2019; and 10-2019-0011883, filed Jan. 30, 2019, the disclosures of each of which are incorporated herein by reference in their entirety.

TECHNICAL FIELD

Embodiments relate to a transformer having a secondary coil unit including stacked conductive plates.

BACKGROUND ART

Various coil parts, such as a transformer or a line filter, are mounted in a power supply device of electronic equipment.

A transformer may be included in electronic equipment for various purposes. For example, the transformer may be used to transmit energy from one circuit to another circuit. In addition, the transformer may also be used to step up or down voltage. In addition, the transformer, which is characterized in that only inductive coupling is performed between primary and secondary windings and thus no DC path is directly formed, may also be used for DC interruption and AC transmission or for insulative separation between two circuits.

In general, the transformer includes a core, which serves as a path of magnetic flux. In order to improve performance of the core, an air gap or a gap is disposed at a middle leg of the core. This will be described with reference to FIG. 1. FIG. 1 is a view illustrating a gap in a general core.

In FIG. 1, a core unit C including general symmetrical E type cores C1 and C2 coupled to each other is shown. When coupled to each other, outer legs of the two E type cores C1 and C2 come into contact with each other; however, middle legs CL1 and CL2 of the cores are spaced apart from each other by a predetermined distance, i.e. a gap G, in a vertical direction. In the case in which the gap G is provided between the middle legs of the core unit C, magnetic properties of a magnetic device using the core unit C are improved, compared to the case in which no gap is provided. However, magnetic energy is concentrated around the gap G as the result of provision of the gap G, whereby the density of current in a coil adjacent to the gap G is increased, compared to the remaining portion of the core unit, and therefore performance of the magnetic device is reduced. In order to reduce side effects due to biasing of magnetic energy while using excellent properties due to the provision of the gap G, therefore, a method of increasing the parallel stack number of a coil adjacent to the gap G is used for a general magnetic device. In this method, however, the construction of the coil is complicated, whereby the weight and size of the device are increased. In addition, an assembly process is complicated, whereby a problem with defect rate management occurs.

DISCLOSURE

Technical Problem

Embodiments have been made in view of the above problems and provide a transformer having higher efficiency.

In addition, embodiments provide a transformer including a secondary coil unit having a structure capable of reducing the effect on current density due to a specific portion of a core unit having high energy density.

In particular, embodiments provide a transformer including a secondary coil unit having a structure capable of reducing the effect on current density due to a gap in a core unit.

Objects of embodiments are not limited to the aforementioned objects, and other unmentioned objects will be clearly understood by those skilled in the art based on the following description.

Technical Solution

In one embodiment, a transformer has a side shape in which a gap in a core unit and conductive plates constituting a secondary coil unit are disposed spaced apart from each other in a vertical direction, whereby a current density problem due to the gap is structurally solved.

To this end, a transformer includes a bobbin, a core unit disposed outside the bobbin, the core unit including an upper core having a first middle leg and a lower core having a second middle leg, the core unit having a gap between the first middle leg and the second middle leg, and a plurality of conductive plates stacked in a thickness direction, wherein each of the plurality of conductive plates has a side shape disposed spaced apart from the gap in the vertical direction.

In addition, a transformer includes a bobbin, a core unit disposed outside the bobbin, the core unit including an upper core having a first middle leg and a lower core having a second middle leg, the core unit having a gap between the first middle leg and the second middle leg, and a plurality of conductive plates inserted into the bobbin, the plurality of conductive plates constituting an upper coil unit, a middle coil unit, and a lower coil unit spaced apart from each other in the vertical direction, wherein the middle coil unit includes a first middle coil unit and a second middle coil unit, and the gap is disposed between the first middle coil unit and the second middle coil unit in the vertical direction.

For example, each of the first middle coil unit and the second middle coil unit may have a side shape disposed spaced apart from the gap in the vertical direction.

For example, the bobbin may have a middle receiving portion configured to receive the middle coil unit, and the middle receiving portion may include a first receiving hole configured to receive the first middle coil unit, a second receiving hole configured to receive the second middle coil unit, and a partition disposed between the first receiving hole and the second receiving hole in the vertical direction, at least a portion of the partition overlapping the gap in a horizontal direction.

For example, the size of the gap in the vertical direction may be less than the distance between the first middle coil unit and the second middle coil unit in the vertical direction.

For example, each of the upper coil unit, the first middle coil unit, the second middle coil unit, and the lower coil unit may include a first type conducive plate and a second type conductive plate stacked in a thickness direction.

For example, the first type conducive plate and the second type conductive plate may have left-right symmetrical planar shapes.

For example, an extension direction of a through hole disposed at a signal end of each of the first type conducive plate and the second type conductive plate may form a predetermined angle with an extension direction of a through hole disposed at a ground end of each of the first type conducive plate and the second type conductive plate.

For example, the predetermined angle may include an obtuse angle.

For example, the conductive plate disposed at the uppermost layer and the conductive plate disposed at the lowermost layer in the vertical direction, among the plurality of conductive plates, may have a larger thickness than the other conductive plates.

In another embodiment, a transformer is configured such that a conductive plate adjacent to the portion of a core unit at which the density of magnetic force energy is relatively high, among conductive plates constituting a secondary coil unit, has a thickness greater than the thickness of the other conductive plates, whereby a current density problem due to biasing of magnetic force energy is structurally solved.

To this end, a transformer includes a bobbin, a core unit disposed outside the bobbin, the core unit including an upper core having a first middle leg and a lower core having a second middle leg, the core unit having a gap between the first middle leg and the second middle leg, and a plurality of conductive plates stacked in the vertical direction, wherein at least one conductive plate adjacent to the gap in the vertical direction, among the plurality of conductive plates, has a larger thickness than the other conductive plates.

In addition, a transformer includes a bobbin, a core unit disposed outside the bobbin, the core unit including an upper core having a first middle leg and a lower core having a second middle leg, the core unit having a gap between the first middle leg and the second middle leg, and a plurality of conductive plates inserted into the bobbin, the plurality of conductive plates constituting an upper coil unit, a middle coil unit, and a lower coil unit spaced apart from each other in the vertical direction, wherein at least one conductive plate of the middle coil unit adjacent to the gap has a larger thickness than the other conductive plates.

For example, the uppermost conductive plate of the upper coil unit and the lowermost conductive plate of the lower coil unit may have a larger thickness than the other conductive plates of the upper coil unit and the lower coil unit.

For example, each of at least one conducive plate of the middle coil unit adjacent to the gap, the uppermost conductive plate of the upper coil unit, and the lowermost conductive plate of the lower coil unit may have a second thickness greater than a first thickness of the other conductive plates.

For example, the plurality of conductive plates may be formed as the result of any one of a 1-1 type conductive plate having a first planar shape and a first thickness and a 1-2 type conductive plate having the first planar shape and a second thickness greater than the first thickness and any one of a 2-1 type conductive plate having a second planar shape and the first thickness and a 2-2 type conductive plate having the second planar shape and the second thickness being alternately stacked in the vertical direction.

For example, the first planar shape and the second planar shape may be left-right symmetrical.

For example, an extension direction of a through hole disposed at a signal end of each of the conducive plate having the first planar shape and the conductive plate having the second planar shape may form a predetermined angle with an extension direction of a through hole disposed at a ground end of each of the conducive plate having the first planar shape and the conductive plate having the second planar shape.

For example, the predetermined angle may include an obtuse angle.

Advantageous Effects

A transformer according to an embodiment has the following effects.

First, even though a gap is provided in a middle leg of a core unit, conductive plates adjacent to the gap are spaced apart from each other in a vertical direction, whereby the effect on current density is reduced.

Second, even though the portion of the core unit to which energy density is biased is present, like the gap in the core unit, the effect on current density is reduced due to relative thickness difference between the conductive plates adjacent to the portion.

Third, the number of conductive plates capable of exhibiting the same performance is reduced due to reduced current density.

It should be noted that the effects of embodiments are not limited to the effects mentioned above, and other unmentioned effects will be clearly understood by those skilled in the art from the following description.

DESCRIPTION OF DRAWINGS

The accompanying drawings, which are provided to assist in understanding the disclosure, illustrate embodiments of the disclosure together with a detailed description thereof. It is to be understood, however, that the technical features of the disclosure are not limited to the specific drawings, and the features disclosed in the drawings may be combined to constitute a new embodiment.

BEST MODE

Reference will now be made in detail to the preferred embodiments of the present invention, examples of which are illustrated in the accompanying drawings. The suffixes "module" and "unit" of elements herein are used for convenience of description and thus can be used interchangeably and do not have any distinguishable meanings or functions.

In describing embodiments, it will be understood that when an element is referred to as being "on or under" or "in front of" or at the rear of another element, this includes the case in which two elements directly contact each other and the case in which at least one other element is disposed between the two elements.

Also, in describing the components of the disclosure, terms such as "first," "second," "A," "B," "(a)," and "(b)" may be used. These terms are used only for the purpose of distinguishing one constituent from another, and the terms do not limit the nature, order or sequence of the components. When one component is said to be "connected," "coupled," or "linked" to another, this may mean not only that the one component is directly connected, coupled, or linked to the other one but also that the one component is "connected," "coupled," or "linked" to the other one via yet another component interposed therebetween.

In addition, the terms "include," "comprise" and "have" mean that elements can be inherent unless otherwise stated. Therefore, the terms should be interpreted not to exclude other elements but to further include such other elements. All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings of the related art from the context. Unless obviously defined in the present invention, such terms are not interpreted as having ideal or excessively formal meanings.

Hereinafter, a transformer according to an embodiment will be described in detail with reference to the accompanying drawings.

Figure 1:
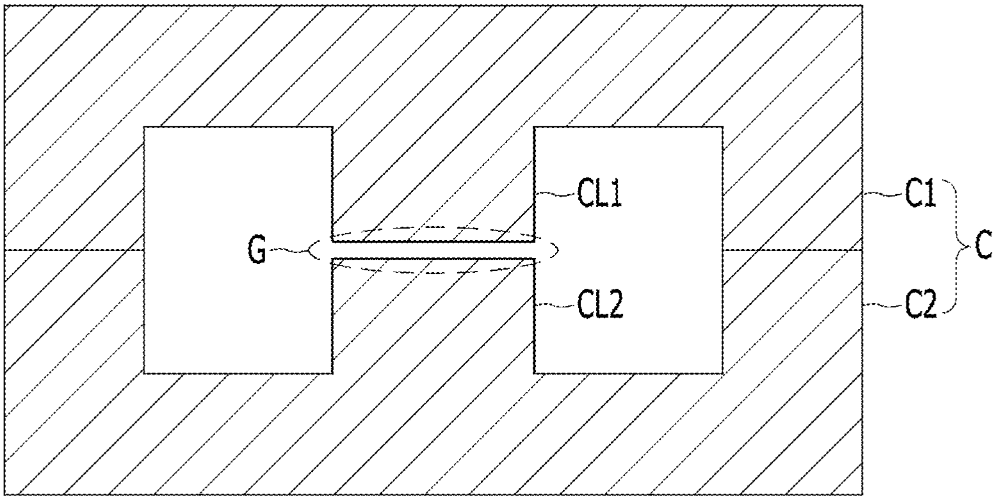
FIG. 1 is a view illustrating a gap in a general core.
Figure 2:
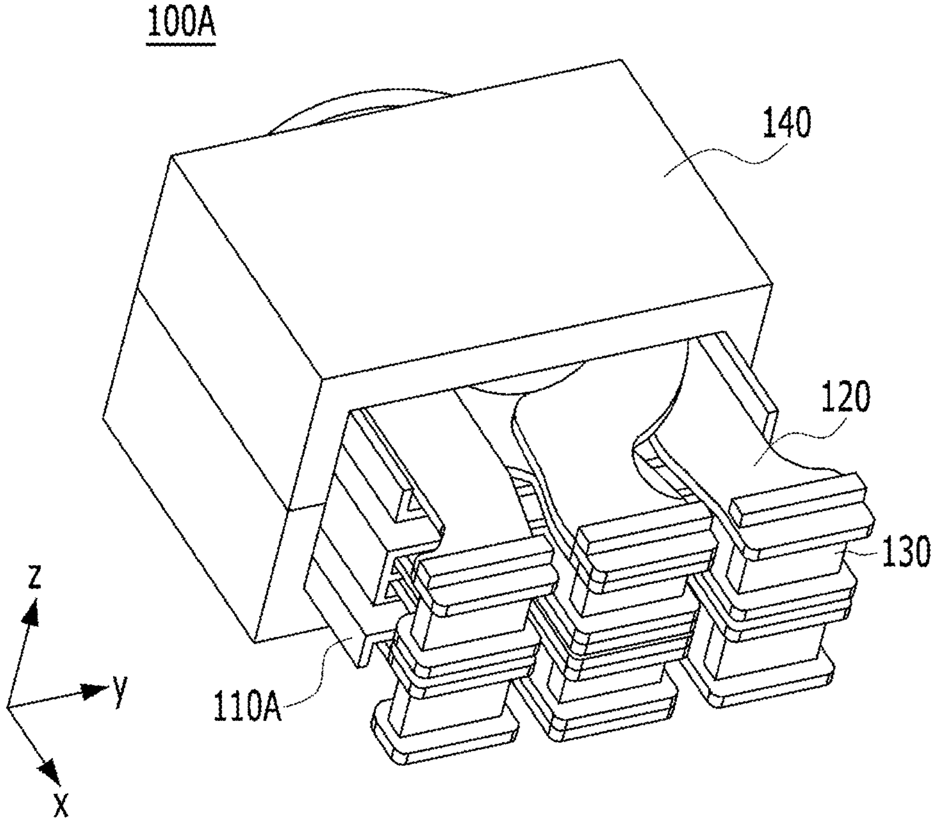
FIG. 2 is a perspective view showing the external appearance of a transformer according to an embodiment.
Figure 3:
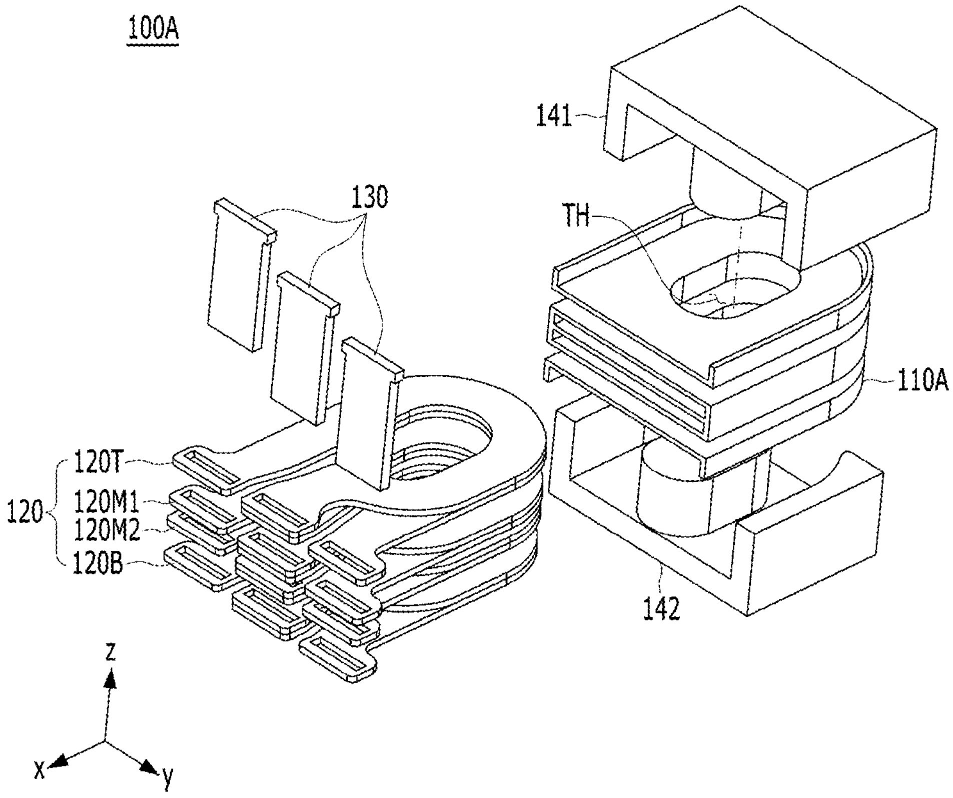
FIG. 3 is an exploded perspective view of the transformer according to the embodiment.

FIG. 2 is a perspective view showing the external appearance of a transformer according to an embodiment, and FIG. 3 is an exploded perspective view of the transformer according to the embodiment.

Referring to FIGS. 2 and 3, the transformer 100A according to the embodiment may include a bobbin 110A, a plurality of conductive plates 120 inserted into the bobbin 110A, a plurality of fastening portions 130 configured to electrically connect the plurality of conductive plates 120 in order to constitute a secondary coil unit together with the plurality of conductive plates 120, and a core unit 140 coupled to the bobbin 110 so as to wrap at least a portion of the outside thereof.

Here, the transformer 100A according to the embodiment may further include a conductive wire wound around the bobbin 110A so as to constitute a primary coil unit. However, illustration of the conductive wire is omitted from the drawings of this specification. The primary coil unit (not shown) may have the shape of a multiple winding formed of a rigid conductive metal, such as a copper conductive wire, wound several times, or the shape of a plate.

The secondary coil unit 120 and 130 may transform and output a power signal received from the primary coil unit (not shown). In FIGS. 2 and 3, a total of 8 conductive plates may be disposed in a state of being stacked in a thickness direction (e.g. a z-axis direction) in order to constitute the secondary coil unit 120 and 130. Each conductive plate may correspond to one turn of the secondary coil unit. However, this is illustrative, and a larger or smaller number of conductive plates may be used.

For example, the plurality of conductive plates 120 may be inserted into the bobbin 110A in a direction parallel to an x axis.

The plurality of conductive plates 120 may be electrically insulated from each other via an insulation material except for electrical connection through the fastening portions 130. For example, an insulation film may be disposed between neighboring ones of the plurality of conductive plates in order to electrically insulate the conductive plates from each other. The insulation film may include a component such as ketone or polyimide. However, the disclosure is not limited thereto. The conductive plates 120 may include an upper coil unit 120T, a first middle coil unit 120M1, a second middle coil unit 120M2, and a lower coil unit 120B, and the coil units 120T, 120M1, 120M2, and 120B may be spaced apart from each other in the thickness direction.

In addition, each of the plurality of conductive plates 120 may include a conductive metal, such as copper. However, the disclosure is not limited thereto. For example, the plurality of conductive plates may include aluminum. In the case in which aluminum is used instead of copper, the thickness of the conductive plate may be greater by about 60% than in the case in which copper is used. However, the disclosure is not limited to such a thickness ratio.

The bobbin 110A may have a shape suitable to receive or fix at least a portion of each of the plurality of conductive plates 120 and the core unit 140 in the state in which the conductive wire (not shown) constituting the primary coil unit, the plurality of conductive plates 120 constituting the secondary coil unit, and the core unit 140 are insulated from each other. For example, the bobbin 110A may have a through hole TH having a planar shape corresponding to the shape of a middle leg of the core unit 140 such that the middle leg extends therethrough.

The bobbin 110A may include an insulative material, such as a resin material, and may be produced using various molding methods. The bobbin 110A according to the embodiment may have openings configured to expose a portion of the upper surface of the uppermost conductive plate in the thickness direction and a portion of the lower surface of the lowermost conductive plate in the thickness direction, among the plurality of conductive plates 120. The more concrete shape of the bobbin 110A will be described below with reference to FIG. 4.

The fastening portions 130, each of which has the shape of a metal bar, may extend through ends of the conductive plates 120 in the thickness direction (e.g. the z-axis direction), and may be fixed to the conductive plates 120 by soldering. Of course, depending on embodiments, the metal bar may be replaced with other fastening members, such as a bolt, a nut, and a washer.

The core unit 140, which has the function of a magnetic circuit, may serve as a path of magnetic flux. The core unit may include an upper core 141 coupled at the upper side thereof and a lower core 142 coupled at the lower side thereof. The two cores 141 and 142 may have up-down symmetrical shapes or asymmetrical shapes. The core unit 140 may include a magnetic material, such as iron or ferrite. However, the disclosure is not limited thereto. The concrete shape of the core unit 140 will be described below with reference to FIG. 5.

Figure 4:
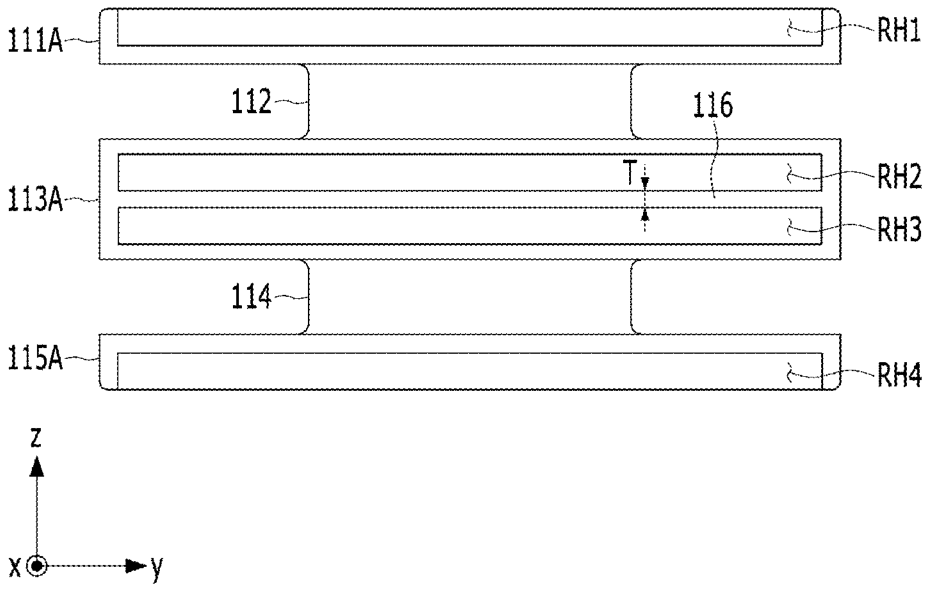
FIG. 4 is a view showing the shape of a bobbin according to an embodiment.

FIG. 4 is a view showing the shape of a bobbin 100A according to an embodiment.

Referring to FIG. 4, the bobbin 110A according to the embodiment may include an upper receiving portion 111A, a middle receiving portion 113A, a lower receiving portion 115A, an upper connection portion 112 configured to connect the upper receiving portion 111A and the middle receiving portion 113A to each other, and a lower connection portion 114 configured to connect the middle receiving portion 113A and the lower receiving portion 115A to each other.

Here, each of the receiving portions 111A, 113A, and 115A may have a "U"-shaped planar shape or a track-shaped planar shape having a semicircle cut off therefrom, and the receiving portions 111A, 113A, and 115A and the two connection portions 112 and 114 may be aligned around the through hole TH in a plane in a vertical direction. In addition, the inner surface of each of the connection portions 112 and 114 may define a side wall of the through hole TH. The through hole TH may have a track-shaped planar shape, which, however, is illustrative. It is sufficient for the through hole to have a shape corresponding to the planar shape of a middle leg of the core unit 14, a description of which will follow.

The receiving portions 111A, 113A, and 115A have receiving holes RH1, RH2, RH3, and RH4 configured to receive the conductive plates 120, and commonly have openings, into which the conductive plates 120 can be inserted, formed in the other side opposite one side which has a semicircular shape in an X-Y plane. For example, the upper receiving portion 111A has an upper receiving hole RH1 configured to receive the upper coil unit 120T, and the lower receiving portion 115A has a lower receiving hole RH4 configured to receive the lower coil unit 120B. In addition, the middle receiving portion 113A has a first middle receiving hole RH2 configured to receive the first middle coil unit 120M1 and a second middle receiving hole RH3 configured to receive the second middle coil unit 120M2. A partition 116 having a predetermined thickness T is disposed between the first middle receiving hole RH2 and the second middle receiving hole RH3. Consequently, the first middle coil unit 120M1 and the second middle coil unit 120M2 are spaced apart from each other by at least the thickness T of the partition 116 in the vertical direction. Consequently, the first middle receiving hole RH2 and the second middle receiving hole RH3 may be separated from each other by the partition 116. At this time, the position of the partition 116 in the vertical direction may at least partially overlap a gap G of the core unit 140 in a horizontal direction, when viewed from the side.

Meanwhile, the upper receiving portion 111A and the lower receiving portion 115A have up-down symmetrical shapes in the thickness direction (e.g. the z-axis direction), the upper receiving portion 111A is open upwards, and the lower receiving portion 115A is open downwards. Consequently, at least a portion of the uppermost conductive plate of the upper coil unit 120T received in the upper receiving portion 111A is exposed upwards, and at least a portion of the lowermost conductive plate of the lower coil unit 120B received in the lower receiving portion 115A is exposed downwards. Consequently, at least one surface of each of the upper coil unit 120T and the lower coil unit 120B has a wide heat dissipation area. As a result, heat may be transferred to ambient air depending on the position of the exposed surface, or heat may be rapidly transferred to the core unit 140 when the core unit 140 is coupled, which is good for heat dissipation.

Unlike the upper receiving portion 111A and the lower receiving portion 115A, the middle receiving portion 113A may be provided with no opening in an upward-downward direction except for the through hole TH. The reason for this is that it is necessary to secure insulation distance between the middle coil unit 120M to be received in the middle receiving portion 113A and the primary coil unit to be wound around the upper connection portion 112 and the lower connection portion 114.

The conductive wire (not shown) constituting the primary coil unit may be wound around the outer surface of the upper connection portion 112 in the space between the upper receiving portion 111A and the middle receiving portion 113A and around the outer surface of the lower connection portion 114 in the space between the middle receiving portion 113A and the lower receiving portion 115A.

Figure 5:
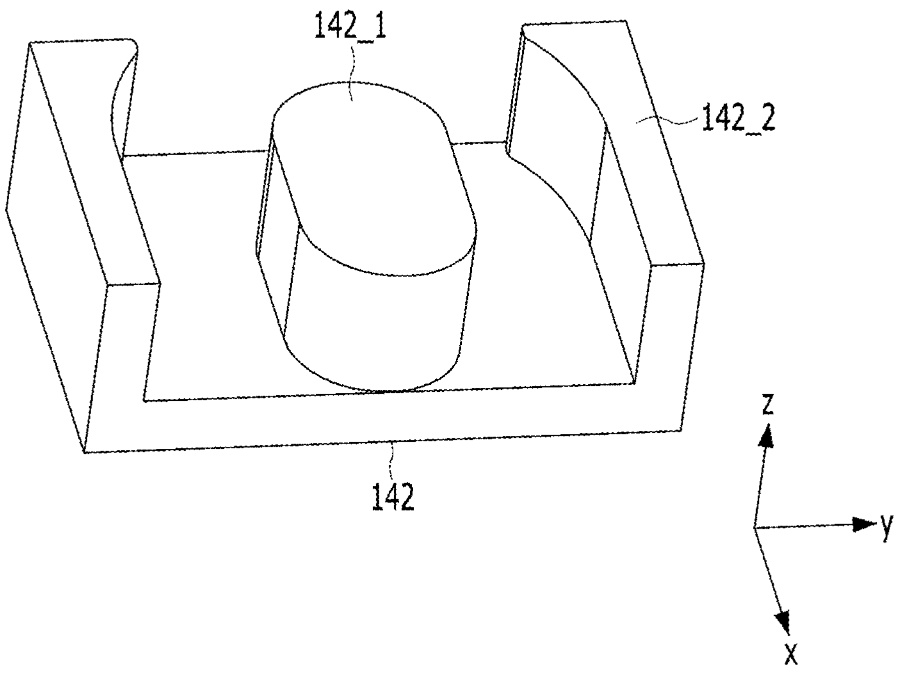
FIG. 5 is a perspective view showing the external appearance of a lower core according to an embodiment.

Next, the construction of the core unit 140 will be described with reference to FIG. 5. FIG. 5 is a perspective view showing the external appearance of the lower core. Although the lower core 142 of the core unit 140 will be described with reference to FIG. 6, a description of the upper core 141 will be substituted thereby on the assumption that the upper core 141 and the lower core 142 have up-down symmetrical shapes.

Referring to FIG. 5, the lower surface of the lower core 142 may have a rectangular planar shape including long sides extending in one direction (e.g. the y-axis direction) and short sides in the other direction (e.g. the x-axis direction) intersecting the one direction.

In addition, the lower core 142 may include a middle leg (or a middle portion) 142_1 having a track-shaped column shape and side portions 142_2 disposed at opposite sides around the middle leg 142_1. A receiving hole, defined between the inner surfaces of the side portions 142_2 and the side surface of the middle leg 142_1 so as to have a cut-off track-shaped planar shape such that the lower core 142 is coupled to the bobbin 110A so as to wrap the bobbin, may correspond in size and shape to the bobbin 110A. This core is also called an "EPC" core.

Meanwhile, the middle leg 142_1 may be inserted into the through hole TH of the bobbin 110A. In addition, when coupled to the bobbin 110, a middle leg (not shown) of the upper core 141 and the middle leg 142_1 of the lower core 142 may be spaced apart from each other by a predetermined distance (e.g. 100 nm) to form a gap G.

Next, the construction of the plurality of conductive plates constituting the secondary coil unit will be described with reference to FIG. 6.

Figure 6:
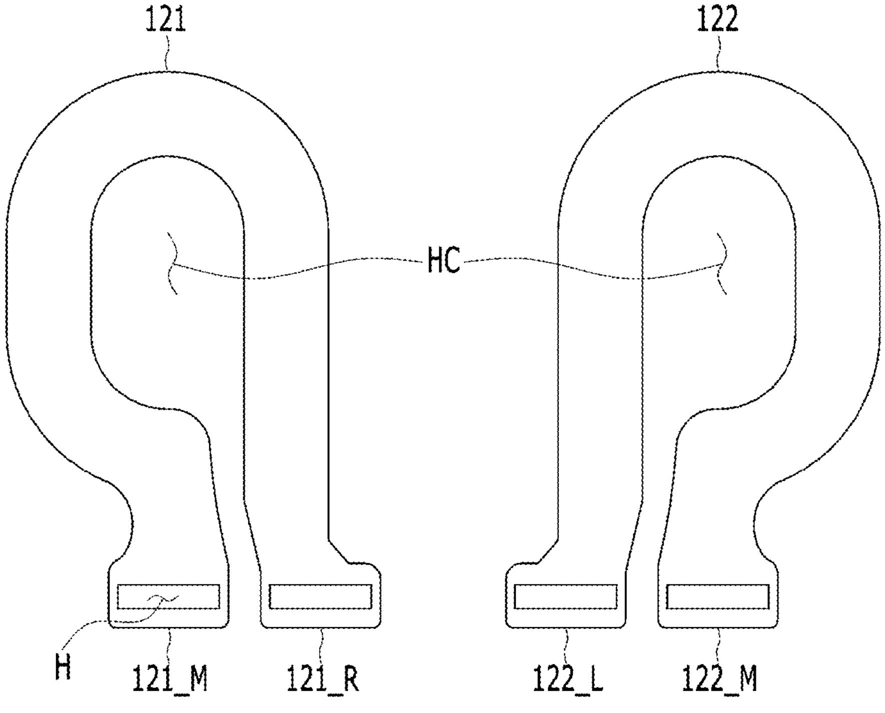
FIG. 6 is a view showing planar shapes of two types of conductive plates according to an embodiment.

FIG. 6 is a view showing planar shapes of two types of conductive plates according to an embodiment.

Referring to FIG. 6, two conductive plates 121 and 122 having different planar shapes are shown. The first type conductive plate 121 has the same shape as the second type conductive plate 122 except that left and right sides thereof are reversed. Consequently, a description will be given based on the first type conductive plate 121.

The conductive plate 121 according to the embodiment may have an open ring-type planar shape having two ends 121_M and 121_R in order to constitute one turn of the secondary coil unit. In this specification including FIG. 6, each of conductive plates 121, 122, 123, and 124 is shown as having an open track shape around a track-shaped hollow cavity HC, which, however, is illustrative. The planar shape may be an open circular/elliptical ring shape or an open polygonal ring shape.

For example, the first type conductive plate 121 may have a "q"-shaped planar shape. In addition, the second type conductive plate 122 may have a "p"-shaped planar shape, since the first type conductive plate 121 and the second type conductive plate 122 have left-right symmetrical shapes.

In addition, each end may be provided with a through hole H, through which the fastening portion 130 extends. In FIG. 6, a through hole H having a rectangular planar shape is shown as being formed in each end. However, the number and position of holes may be changed.

Each of the upper coil unit 120T, the first middle coil unit 120M1, the second middle coil unit 120M2, and the lower coil unit 120B may be constituted as the result of one first type conductive plate 121 and one second type conductive pl 122 being stacked so as to be aligned around the hollow cavity HC in the vertical direction in a state of forming a pair.

Meanwhile, based on the first type conductive plate 121, the first end 121_M may be referred to as a ground end, since the first end is connected to the ground, and the second end 121_R may be referred to as a first signal end, since the second end is connected to one signal line. Similarly, the second type conductive plate 122 may also have one ground end 122_M and one signal end 122_L. The signal end 122_L is located in a direction opposite the first signal end 121_R, and may be referred to as a second signal end.

In the case in which two sheets of conductive plates are applied to one coil unit constituting the secondary coil unit 120 and 130, e.g. the upper coil unit 120T, therefore, two ground ends, two first signal ends, and two second signal ends are provided. Here, the two ground ends may be arranged around the through hole H so as to at least partially overlap each other in the vertical direction.

Figure 7:
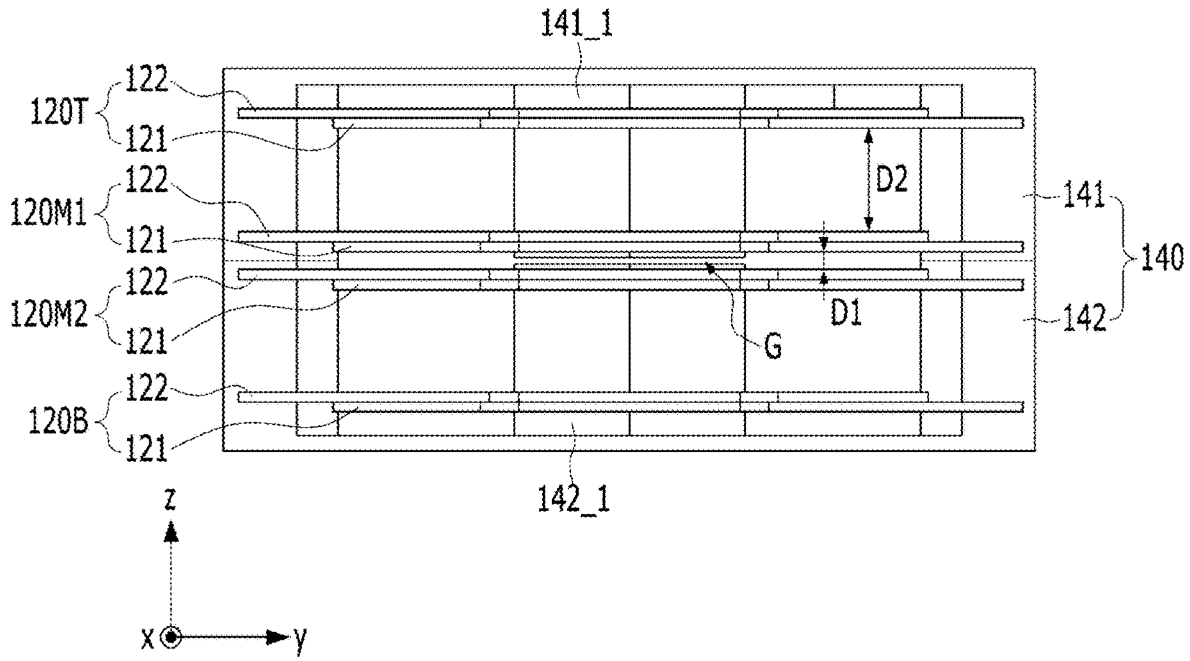
FIG. 7 is a side view illustrating disposition between a gap and conductive plates according to an embodiment.

FIG. 7 is a side view illustrating disposition between a gap and conductive plates according to an embodiment. In FIG. 7, only the conductive plates 120 and the core unit 140 are shown for easy understanding.

Referring to FIG. 7, the secondary coil unit according to the embodiment may include a total of 8 conductive plates. At this time, the first type conductive plates 121 and the second type conductive plates 122 may be alternately stacked in the vertical direction. In addition, the two upper conductive plates may constitute the upper coil unit 120T as a group, the four middle conductive plates may constitute the middle coil unit 120M1 and 120M2 as another group, and the two lower conductive plates may constitute the lower coil unit 120B as a further group.

As shown, the upper coil unit 120T, the middle coil unit 120M1 and 120M2, and the lower coil unit 120B may be spaced apart from each other by a predetermined distance in the vertical direction. Here, the distance D2 between the upper coil unit 120T and the first middle coil unit 120M1 may be greater than the height of the upper connection portion 112, and the distance D3 between the second middle coil unit 120M2 and the lower coil unit 120B may be greater than the height of the lower connection portion 114. Depending on embodiments, D2 and D3 may be equal to each other or may be different from each other. For example, in the case in which the upper core 141 and the lower core 142 have up-down symmetrical shapes, D2 and D3 may be equal to each other.

In addition, the distance D1 between the first middle coil unit 120M1 and the second middle coil unit 120M2 may be equal to or greater than the thickness T of the partition 116 of the bobbin 110A. However, it is preferable for the distance D1 between the first middle coil unit 120M1 and the second middle coil unit 120M2 to be greater than the vertical-direction size of the gap G disposed between a middle leg 141_1 of the upper core 141 and the middle core 142_1 of the lower core 142. In addition, as shown, the upper coil unit 120T, the first middle coil unit 120M1, the second middle coil unit 120M2, and the lower coil unit 120B, particularly the first middle coil unit 120M1 and the second middle coil unit 120M2 adjacent to the gap G, may have side shapes disposed spaced apart from each other in the vertical direction. For example, the gap G is disposed between the first middle coil unit 120M1 and the second middle coil unit 120M2 in the vertical direction, and the gap G, the first middle coil unit 120M1, and the second middle coil unit 120M2 do not overlap each other in the horizontal direction. In addition, the distance between the first middle coil unit 120M1 and the gap G and the distance between the second middle coil unit 120M2 and the gap G may be equal to each other in the vertical direction. Since the first middle coil unit 120M1 and the second middle coil unit 120M2 are spaced apart from each other around the gap G in the vertical direction, as described above, the effect on magnetic force energy biased to the gap G on the density of current in the first middle coil unit 120M1 and the second middle coil unit 120M2 may be reduced. Generation of heat in the middle coil unit may be reduced and the number of conductive plates capable of exhibiting the same performance may also be reduced, compared to case in which the first middle coil unit 120M1 and the second middle coil unit 120M2 at least partially overlap the gap G while not being spaced apart from each other in the vertical direction.

Meanwhile, the portion of the core unit 140 to which the magnetic force energy is biased may include portions (i.e. the upper part of 141_1 and the lower part of 142_1) at which the middle legs 141_1 and 142_1 are connected to the remaining portion of the core unit 140, in addition to the gap G. Since these portions are closest to the conductive plates located at the outermost sides in the vertical direction, among the conductive plates, the density of current in the outermost conductive plates may be increased. Consequently, a change in density of current may be reduced using a method of increasing the thickness of the outermost conductive plates so as to be greater than the thickness of the other conductive plates in order to increase the sectional area thereof, which will be described with reference to FIG. 8.

Figure 8:
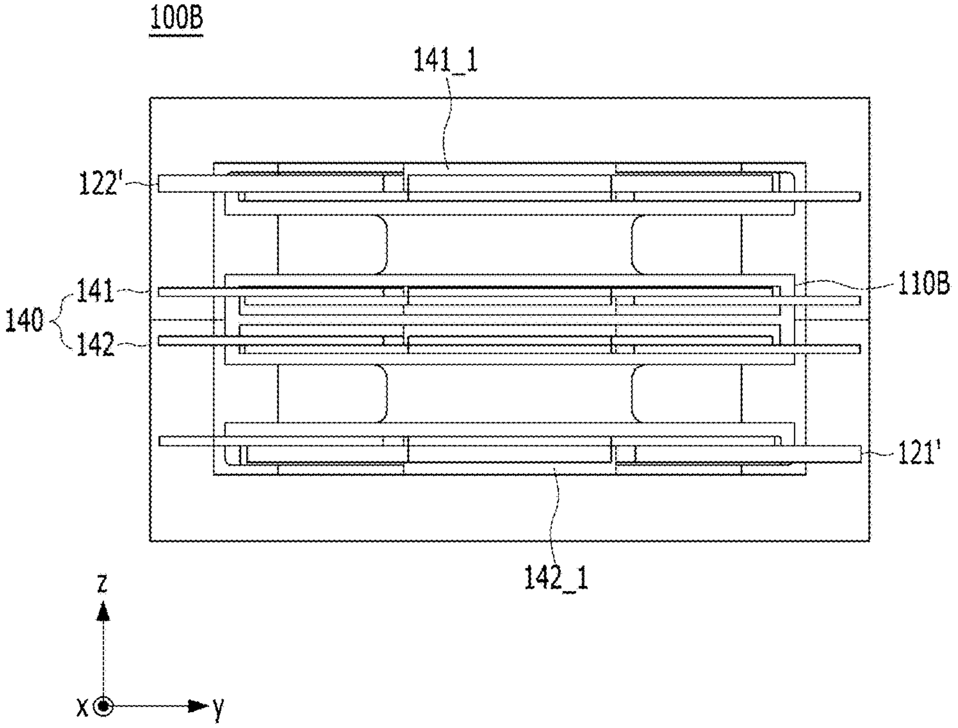
FIG. 8 is a side view showing an example of the structure of a transformer according another aspect of the embodiment.

FIG. 8 is a side view showing an example of the structure of a transformer according to another aspect of the embodiment. The transformer 100B shown in FIG. 8 is identical in construction to the transformer 100A according to the embodiment except that the thickness of the uppermost conductive plate 122' and the lowermost conductive plate 121' is greater than the thickness of the other conductive plates, and a duplicate description will be omitted. For example, the structure of a bobbin 110B shown in FIG. 8 may be identical to the structure of the bobbin 110A shown in FIG. 4.

Since the thickness of the two conductive plates 121' and 122' located at the outermost sides in the vertical direction is greater than the thickness of the other conductive plates, the sectional area of the conductive plates 121' and 122' is relatively large. Consequently, a change in current density due to biasing of magnetic force energy in the core unit 140 may be reduced. The effects of the above structure will be described with reference to FIGS. 9A and 9B.

Figure 9A:
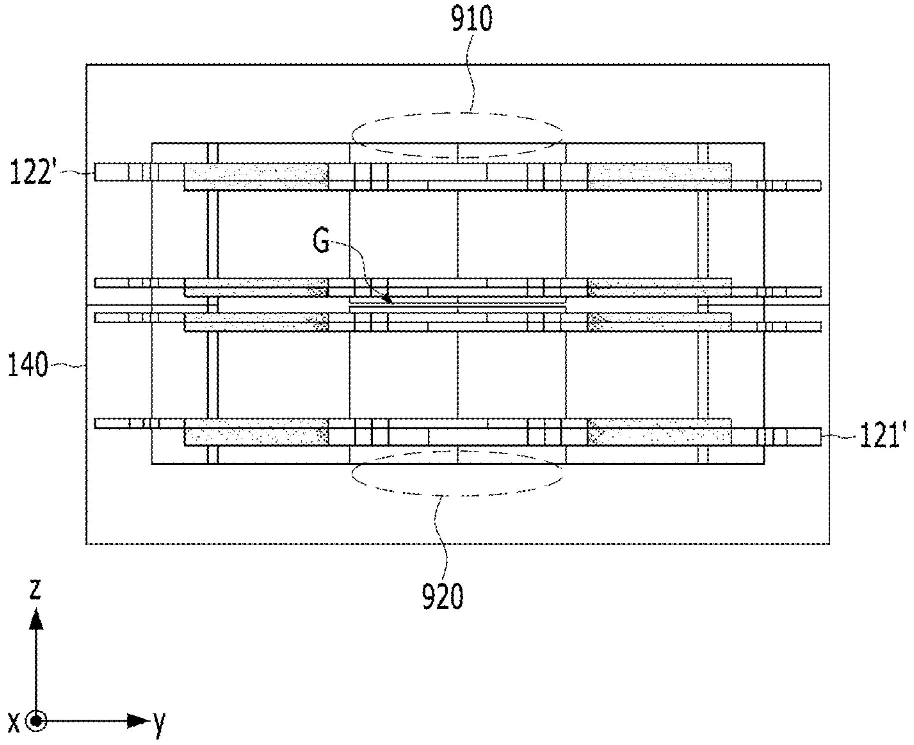
FIG. 9A is a view showing the density of current in a secondary coil unit of the transformer shown in FIG. 8.
Figure 9B:
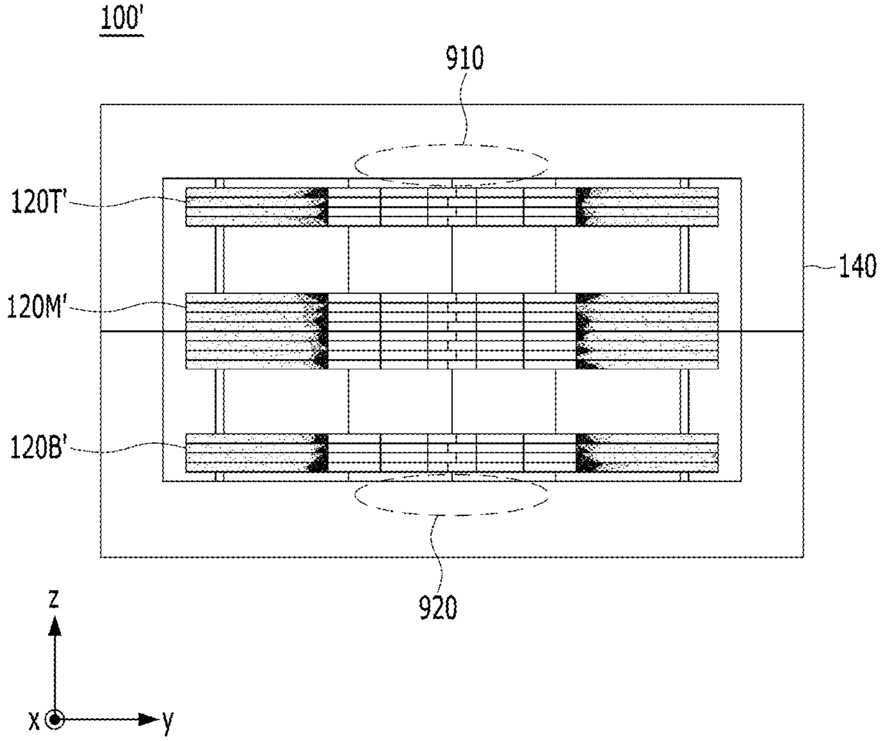
FIG. 9B is a view showing the density of current in a secondary coil unit of a transformer according to a comparative example.

FIG. 9A is a view showing the density of current in the secondary coil unit of the transformer shown in FIG. 8, and FIG. 9B is a view showing the density of current in a secondary coil unit of a transformer according to a comparative example.

In FIG. 9A, only the conductive plates and the core unit 140 of the transformer 100B shown in FIG. 8 are shown for easy understanding, and only conductive plates and a core unit of the transformer 100' according to the comparative example are shown in FIG. 9B. In the transformer 100' according to the comparative example, a middle coil unit 120M' is not divided and at least partially overlaps a gap G in the horizontal direction, compared to the transformer 100B according to the other embodiment. Also, it is assumed that, in the transformer 100' according to the comparative example, each of an upper coil unit 120T' and a lower coil unit 120B' includes four sheets of conductive plates, and the middle coil unit 120M' includes eight sheets of conductive plates and that the transformer according to the comparative example has the same capacity as the transformer 100B according to the other embodiment.

When comparing FIGS. 9A and 9B with each other, any conductive plates constituting the middle coil unit have side shapes that do not overlap the gap G in the horizontal direction and are spaced apart from each other in the vertical direction in FIG. 9A, whereby the effect on magnetic force energy biased to the gap G is not great. However, it can be seen that high current density is formed around a middle leg of the core unit 140 in FIG. 9B.

In addition, although the density of magnetic force energy in portions 910 and 920 at which the middle leg of the core unit 140 is connected to the remaining portion of the core unit 140 is high, a change in current density is small, since the outermost conductive plates in the vertical direction have a larger thickness than the other plates in FIG. 9A. In contrast, it can be seen that high current density is formed in the upper coil unit 120T' and the lower coil unit 120B' adjacent to portions 910 and 920 at which the middle leg is connected to the remaining portion of the core unit 140 in FIG. 9B.

As a result, the transformer according to the embodiment is configured such that the density of current in the conductive plates is reduced while having performance corresponding to that of the transformer according to the comparative example, whereby coil loss may be reduced, and therefore the number of stacks may be reduced. Consequently, the height of all parts of the transformer may be reduced, and therefore the length of a magnetic path of the core may be reduced, which leads to inhibition of core loss. In addition, generation of heat in the conductive plates may also be reduced due to a decrease in current density.

Hereinafter, a transformer according to another embodiment will be described.

Figure 10:
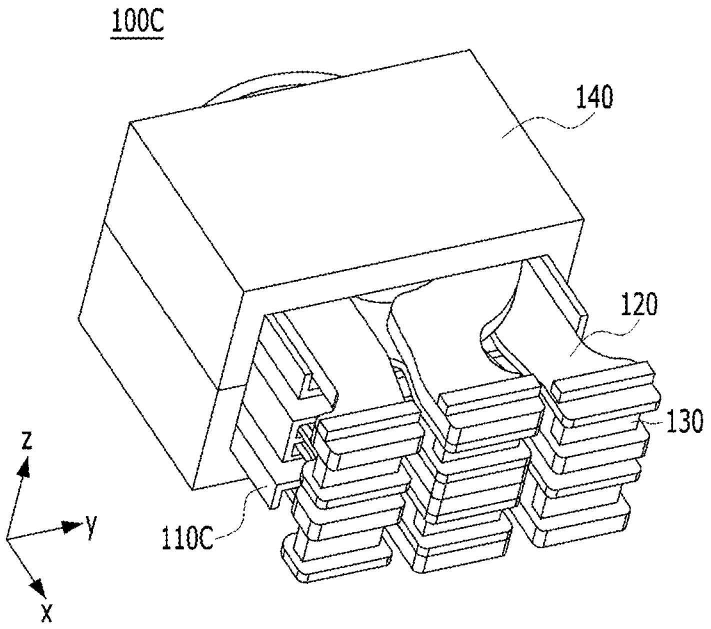
FIG. 10 is a perspective view showing the external appearance of a transformer according to another embodiment.
Figure 11:
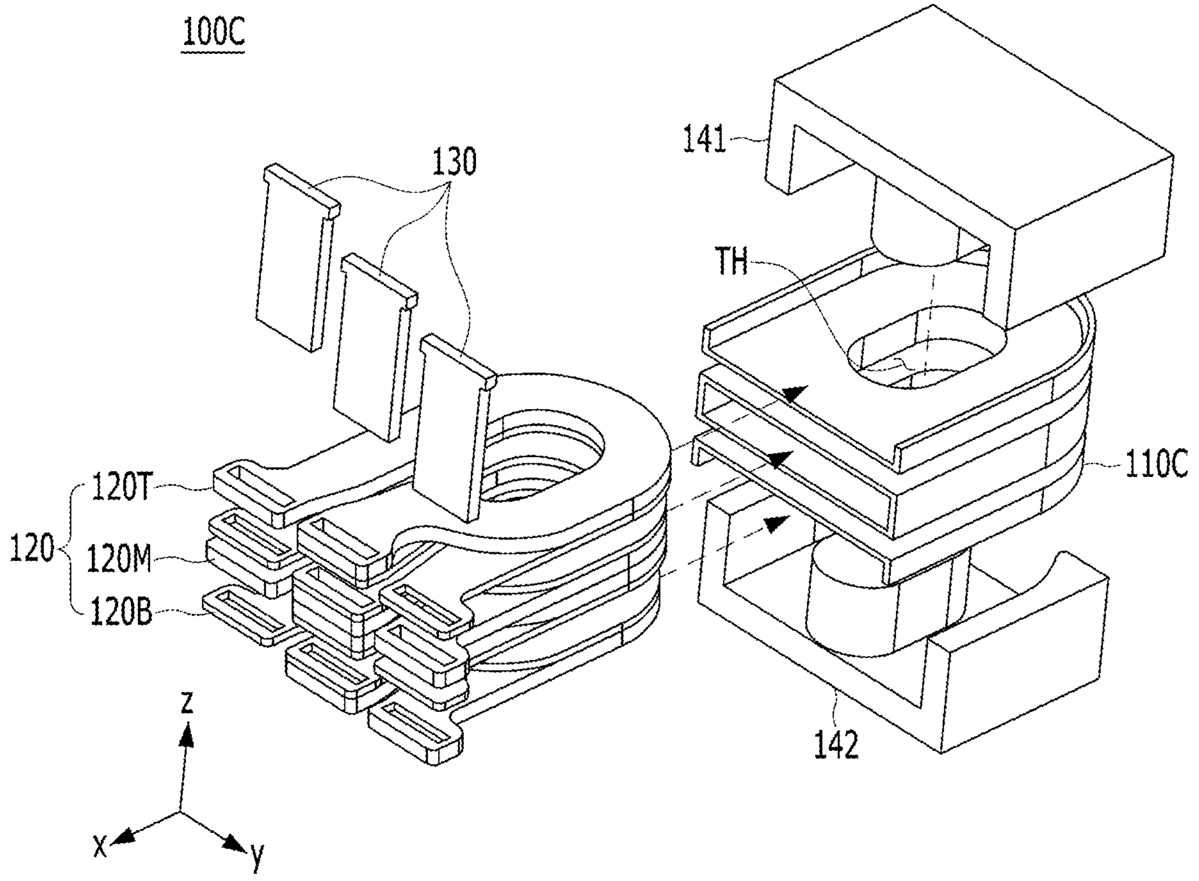
FIG. 11 is an exploded perspective view of the transformer according to the other embodiment.

FIG. 10 is a perspective view showing the external appearance of a transformer according to another embodiment, and FIG. 11 is an exploded perspective view of the transformer according to the other embodiment.

Referring to FIGS. 10 and 11, the transformer 100C according to the other embodiment may include a bobbin 110C, a plurality of conductive plates 120 inserted into the bobbin 110A, a plurality of fastening portions 130 configured to electrically connect the plurality of conductive plates 120 in order to constitute a single secondary coil unit together with the plurality of conductive plates 120, and a core unit 140 coupled to the bobbin 110 so as to wrap at least a portion of the outside thereof.

Here, the transformer 100C according to the embodiment may further include a conductive wire wound around the bobbin 110C so as to constitute a primary coil unit. However, illustration of the conductive wire is omitted from the drawings of this specification. The primary coil unit (not shown) may have the shape of a multiple winding formed of a rigid conductive metal, such as a copper conductive wire, wound several times, or the shape of a plate.

The secondary coil unit 120 and 130 may transform and output a power signal received from the primary coil unit (not shown). In FIGS. 10 and 11, a total of 8 conductive plates may be disposed in a state of being stacked in the thickness direction (e.g. the z-axis direction) in order to constitute the secondary coil unit 120 and 130. Each conductive plate may correspond to one turn of the secondary coil unit. However, this is illustrative, and a larger or smaller number of conductive plates may be used.

For example, the plurality of conductive plates 120 may be inserted into the bobbin 110C in a direction parallel to the x axis.

The plurality of conductive plates 120 may be electrically insulated from each other via an insulation material except for electrical connection through the fastening portions 130. For example, an insulation film may be disposed between neighboring ones of the plurality of conductive plates in order to electrically insulate the conductive plates from each other. The insulation film may include a component such as ketone or polyimide. However, the disclosure is not limited thereto. The conductive plates 120 may include an upper coil unit 120T, a middle coil unit 120M, and a lower coil unit 120B, and the coil units 120T, 120M, and 120B may be spaced apart from each other in the thickness direction.

In addition, each of the plurality of conductive plates 120 may include a conductive metal, such as copper. However, the disclosure is not limited thereto. For example, the plurality of conductive plates may include aluminum. In the case in which aluminum is used instead of copper, the thickness of the conductive plate may be greater by about 60% than in the case in which copper is used. However, the disclosure is not limited to such a thickness ratio.

The bobbin 110C may have a shape suitable to receive or fix at least a portion of each of the plurality of conductive plates 120 and the core unit 140 in the state in which the conductive wire (not shown) constituting the primary coil unit, the plurality of conductive plates 120 constituting the secondary coil unit, and the core unit 140 are insulated from each other. For example, the bobbin 110C may have a through hole TH having a planar shape corresponding to the shape of a middle leg of the core unit 140 such that the middle leg extends therethrough.

The bobbin 110C may include an insulative material, such as a resin material, and may be produced using various molding methods. The bobbin 110C according to this embodiment may have openings configured to expose the upper surface of the uppermost conductive plate in the thickness direction and the lower surface of the lowermost conductive plate in the thickness direction, among the plurality of conductive plates 120. The more concrete shape of the bobbin 110C will be described below with reference to FIG. 12.

The fastening portions 130, each of which has the shape of a metal bar, may extend through ends of the conductive plates 120 in the thickness direction (e.g. the z-axis direction), and may be fixed to the conductive plates 120 by soldering. Of course, depending on embodiments, the metal bar may be replaced with other fastening members, such as a bolt, a nut, and a washer.

The core unit 140, which has the function of a magnetic circuit, may serve as a path of magnetic flux. The core unit may include an upper core 141 coupled at the upper side thereof and a lower core 142 coupled at the lower side thereof. The two cores 141 and 142 may have up-down symmetrical shapes or asymmetrical shapes. The core unit 140 may include a magnetic material, such as iron or ferrite. However, the disclosure is not limited thereto. The concrete shape of the core unit 140 is the same as what was described with reference to FIG. 5, and therefore a duplicate description will be omitted.

Figure 12:
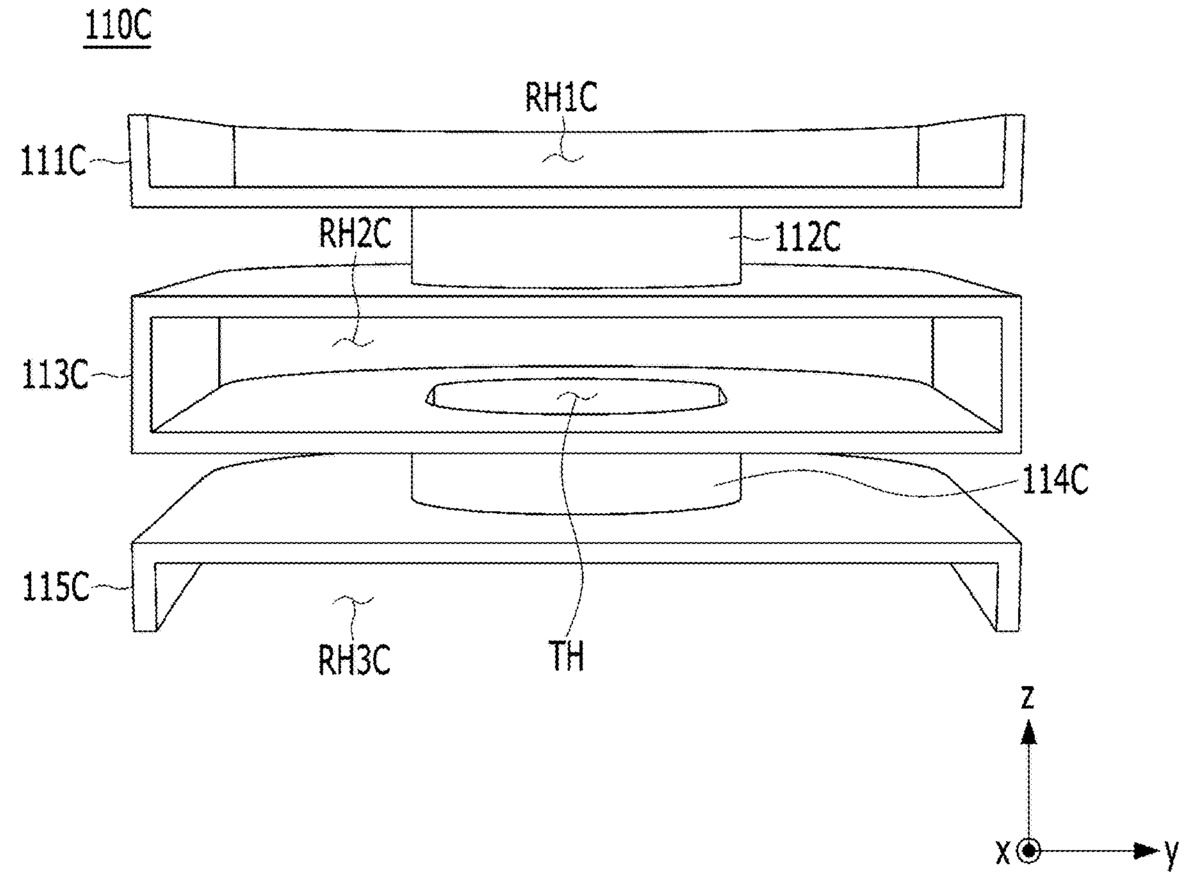
FIG. 12 is a view showing the shape of a bobbin according to another embodiment.

FIG. 12 is a view showing the shape of a bobbin 110C according to another embodiment.

Referring to FIG. 12, the bobbin 110C according to the other embodiment may include an upper receiving portion 111C, a middle receiving portion 113C, a lower receiving portion 115C, an upper connection portion 112C configured to connect the upper receiving portion 111C and the middle receiving portion 113C to each other, and a lower connection portion 114C configured to connect the middle receiving portion 113C and the lower receiving portion 115C to each other.

Here, each of the receiving portions 111C, 113C, and 115C may have a "U"-shaped planar shape or a track-shaped planar shape having a semicircle cut off therefrom, and the receiving portions 111C, 113C, and 115C and the two connection portions 112C and 114C may be aligned around the through hole TH in a plane in the vertical direction. In addition, the inner surface of each of the connection portions 112C and 114C may define a side wall of the through hole TH. The through hole TH may have a track-shaped planar shape, which, however, is illustrative. It is sufficient for the through hole to have a shape corresponding to the planar shape of the middle leg of the core unit 14 described above.

The receiving portions 111C, 113C, and 115C have receiving holes RH1C, RH2C, and RH3C configured to receive the conductive plates 120, respectively, and commonly have openings, into which the conductive plates 120 can be inserted, formed in the other side opposite one side which has a semicircular shape in an X-Y plane. For example, the upper receiving portion 111C has an upper receiving hole RH1C configured to receive the upper coil unit 120T, and the lower receiving portion 115C has a lower receiving hole RH3C configured to receive the lower coil unit 120B. In addition, the middle receiving portion 113C has a middle receiving hole RH2C configured to receive the first middle coil unit 120M.

Meanwhile, the upper receiving portion 111C and the lower receiving portion 115C have up-down symmetrical shapes in the thickness direction (e.g. the z-axis direction), the upper receiving portion 111C is open upwards, and the lower receiving portion 115C is open downwards. Consequently, at least a portion of the uppermost conductive plate of the upper coil unit 120T received in the upper receiving portion 111C is exposed upwards, and at least a portion of the lowermost conductive plate of the lower coil unit 120B received in the lower receiving portion 115C is exposed downwards. Consequently, at least one surface of each of the upper coil unit 120T and the lower coil unit 120B has a wide heat dissipation area. As a result, heat may be transferred to ambient air depending on the position of the exposed surface, or heat may be rapidly transferred to the core unit 140 when the core unit 140 is coupled, which is good for heat dissipation.

Unlike the upper receiving portion 111C and the lower receiving portion 115C, the middle receiving portion 113C may be provided with no opening in the upward-downward direction except for the through hole TH. The reason for this is that it is necessary to secure insulation distance between the middle coil unit 120M to be received in the middle receiving portion 113C and the primary coil unit to be wound around the upper connection portion 112C and the lower connection portion 114C.

The conductive wire (not shown) constituting the primary coil unit may be wound around the outer surface of the upper connection portion 112C in the space between the upper receiving portion 111C and the middle receiving portion 113C and around the outer surface of the lower connection portion 114C in the space between the middle receiving portion 113C and the lower receiving portion 115C.

Meanwhile, the construction of the plurality of conductive plates constituting the second coil unit is identical to what was described with reference to FIG. 6, and therefore a duplicate description will be omitted. The first type conductive plates 121 and the second type conductive plates 122 described with reference to FIG. 6 are classified based on the planar shape thereof. However, the conductive plates 120 constituting the secondary coil unit according to the embodiment may be classified based on the thickness thereof. For example, similarly to what is shown in FIGS. 8 and 9A, the conductive plates applied to this embodiment include a 1-1 type conductive plate 121 having a first thickness in the vertical direction (e.g. the z-axis direction) and a 1-2 type conductive plate 121' having the same planar shape as the 1-1 type conductive plate 121 and having a second thickness greater than the first thickness. In addition, the conductive plates applied to embodiments further include a 2-1 type conductive plate 122 having a first thickness in the vertical direction (e.g. the z-axis direction) and a 2-2 type conductive plate 122' having the same planar shape as the 2-1 type conductive plate 122 and having a second thickness greater than the first thickness.

Each of the upper coil unit 120T, the middle coil unit 120M, and the lower coil unit 120B may be constituted as the result of any one of the 1-1 type conductive plate 121 and the 1-2 type conductive plate 121' and any one of the 2-1 type conductive plate 122 and the 2-2 type conductive plate 122' being alternately stacked so as to be aligned around the hollow cavity HC in the vertical direction in a state of forming at least a pair.

For example, one of the two conductive plates forming a pair may have the first thickness and the other may have the second thickness. However, the disclosure is not limited thereto. The conductive plate adjacent to the portion of the core unit 140 having high magnetic force energy density in the vertical direction may have the second thickness.

The disposition of the conductive plates satisfying the above conditions will be described with reference to FIG. 13.

Figure 13:
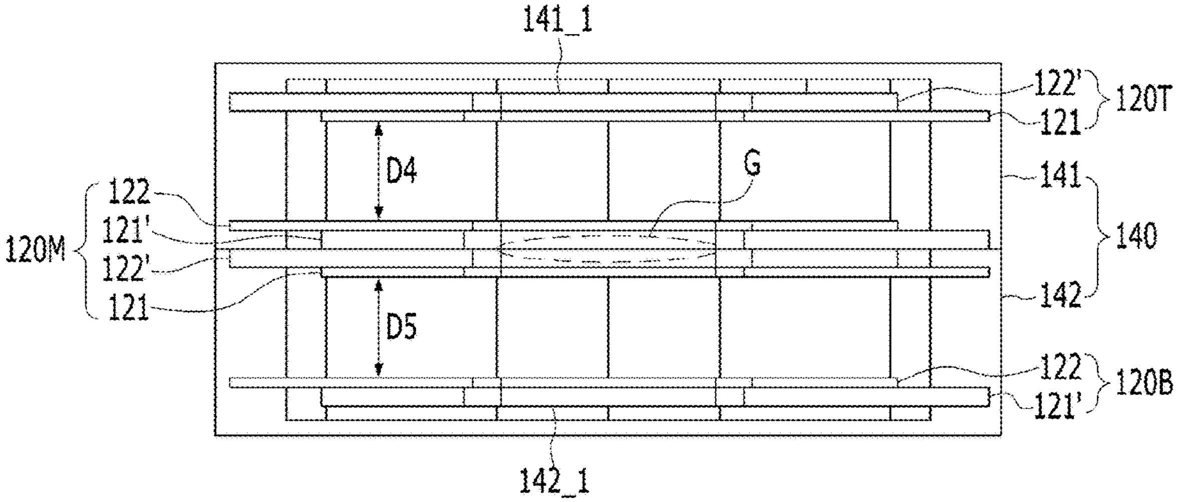
FIG. 13 is a side view illustrating disposition between a core unit and conductive plates according to another embodiment.

FIG. 13 is a side view illustrating disposition between a core unit and conductive plates according to another embodiment. In FIG. 13, only the conductive plates 120 and the core unit 140 are shown for easy understanding.

Referring to FIG. 13, the secondary coil unit according to the embodiment may include a total of 8 conductive plates. At this time, any one of the 1-1 type conductive plate 121 and the 1-2 type conductive plate 121' and any one of the 2-1 type conductive plate 122 and the 2-2 type conductive plate 122' may be alternately stacked. In addition, the two upper conductive plates may constitute the upper coil unit 120T as a group, the four middle conductive plates may constitute the middle coil unit 120M as another group, and the two lower conductive plates may constitute the lower coil unit 120B as a further group.

At this time, a conductive plate adjacent to the portion of the core unit to which the density of magnetic force is relatively biased, among the conductive plates, may have a thickness greater than the thickness of the other conductive plates. As previously described, the portion of the core unit to which the density of magnetic force is relatively biased may include the gap G and the portions (i.e. the upper part of 141_1 and the lower part of 142_1 at which the middle legs 141_1 and 142_1 are connected to the remaining portion of the core unit 140.

Consequently, the 1-2 type conductive plate 121' and the 2-2 type conductive plate 122', each of which has the second thickness, may be applied to the two middle conductive plates of the middle core unit 120M disposed so as to have side shapes that are adjacent to the gap G or at least partially overlap the gap G in the vertical direction. In addition, conductive plates having the second thickness may be applied to the two conductive plates disposed at the outermost sides in the vertical direction. For example, the 2-2 type conductive plate 122', which has the second thickness, may also be applied to the uppermost conductive plate of the upper coil unit 120T, and the 1-2 type conductive plate 121', which has the second thickness, may also be applied to the lowermost conductive plate of the lower coil unit 120B.

Since the thickness of the conductive plates adjacent to the gap G and the portions (i.e. the upper part of 141_1 and the lower part of 142_1) at which the middle legs 141_1 and 142_1 are connected to the remaining portion of the core unit 140 is greater than the thickness of the other conductive plates, as described above, the sectional area of a path along which current flows may be increased, whereby the effect on current density due to biasing of magnetic force energy in the core unit 140 may be reduced. Consequently, generation of heat in each coil unit may be reduced and the number of conductive plates capable of exhibiting the same performance may also be reduced, compared to a transformer configured such that all conductive plates constituting the secondary coil unit have the same thickness.

Meanwhile, as shown, the upper coil unit 120T, the middle coil unit 120M, and the lower coil unit 120B may be spaced apart from each other by a predetermined distance in the vertical direction. Here, the distance D4 between the upper coil unit 120T and the middle coil unit 120M and the distance D5 between the middle coil unit 120M and the lower coil unit 120B may be equal to each other or may be different from each other. For example, in the case in which the upper core 141 and the lower core 142 have up-down symmetrical shapes, D4 and D5 may be equal to each other.

The effects of the transformer according to the above embodiment will be described with reference to FIG. 14.

Figure 14:
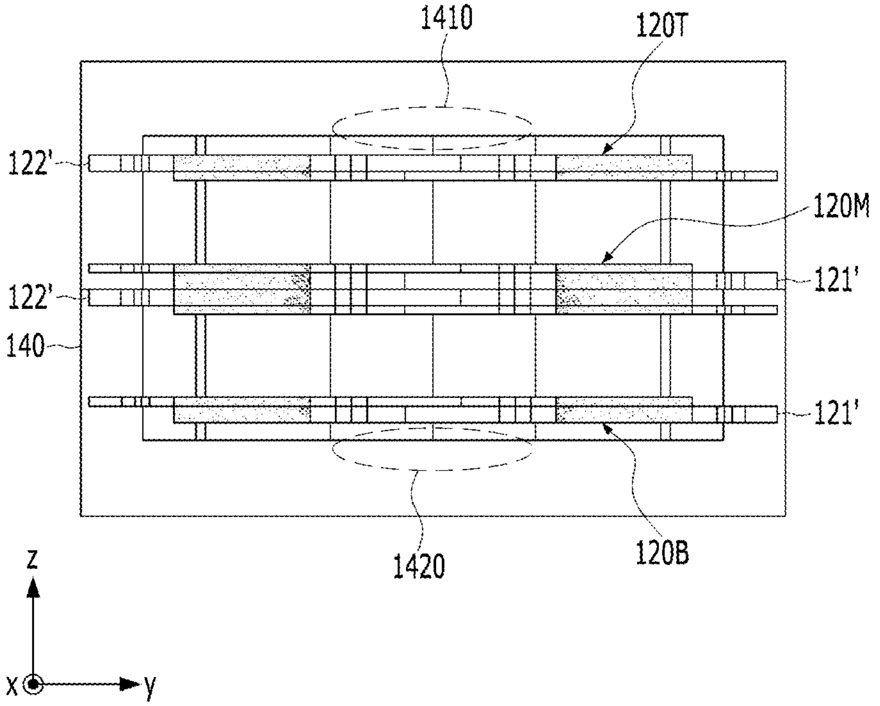
FIG. 14 is a view showing the density of current in a secondary coil unit of the transformer shown in FIG. 13.

FIG. 14 is a view showing the density of current in the secondary coil unit of the transformer shown in FIG. 13, and it is assumed that a comparative example is identical to what is shown in FIG. 9B.

In FIG. 14, only the conductive plates 120 and the core unit 140 of the transformer 100C according to the other embodiment are shown, in a similar manner as in FIG. 13, for easy understanding.

That is, it is assumed that, in the transformer 100' according to the comparative example, each of the upper coil unit 120T' and the lower coil unit 120B' includes four sheets of conductive plates, and the middle coil unit 120M' includes eight sheets of conductive plates, compared to the transformer 100C according to the other embodiment, that all of the conductive plates have the same thickness, and that the transformer according to the comparative example has the same capacity as the transformer 100C according to the other embodiment.

When comparing FIGS. 14 and 9B with each other, the two conductive plates 121' and 122' located at the middle, among the conductive plates constituting the middle coil unit 120M, have a thickness greater than the thickness of the other conductive plates in FIG. 14, whereby the effect on magnetic force energy biased to the gap G is not great. However, it can be seen that high current density is generally formed around the middle leg of the core unit 140 in FIG. 9B.

In addition, although the density of magnetic force energy in portions 1410 and 1420 at which the middle leg of the core unit 140 is connected to the remaining portion of the core unit 140 is high, a change in current density is small, since the outermost conductive plates (122' of 120T and 121' of 120B) in the vertical direction have a larger thickness than the other plates in FIG. 14. In contrast, it can be seen that high current density is formed in the upper coil unit 120T' and the lower coil unit 120B' adjacent to portions 910 and 920 at which the middle leg is connected to the remaining portion of the core unit 140 in FIG. 9B.

As a result, the transformer according to this embodiment is configured such that the density of current in the conductive plates is reduced while having performance corresponding to that of the transformer according to the comparative example, whereby coil loss may be reduced, and therefore the number of stacks may be reduced. Consequently, the height of all parts of the transformer may be reduced, and therefore the length of a magnetic path of the core may be reduced, which leads to inhibition of core loss. In addition, generation of heat in the conductive plates may also be reduced due to a decrease in current density.

Meanwhile, in a further embodiment of the present invention, a change in form of through holes formed in signal ends of conductive plates may be considered for higher efficiency. This will be described with reference to FIGS. 15 and 16.

Figure 15:
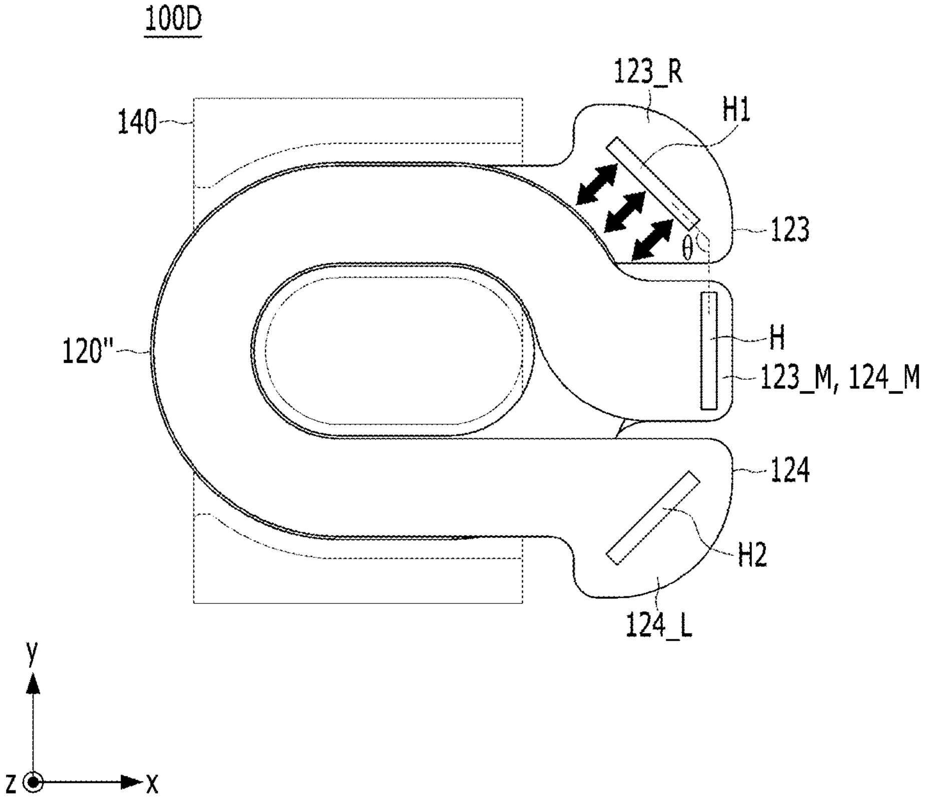
FIG. 15 is a plan view showing an example of the structure of a transformer according to a further embodiment.
Figure 16:
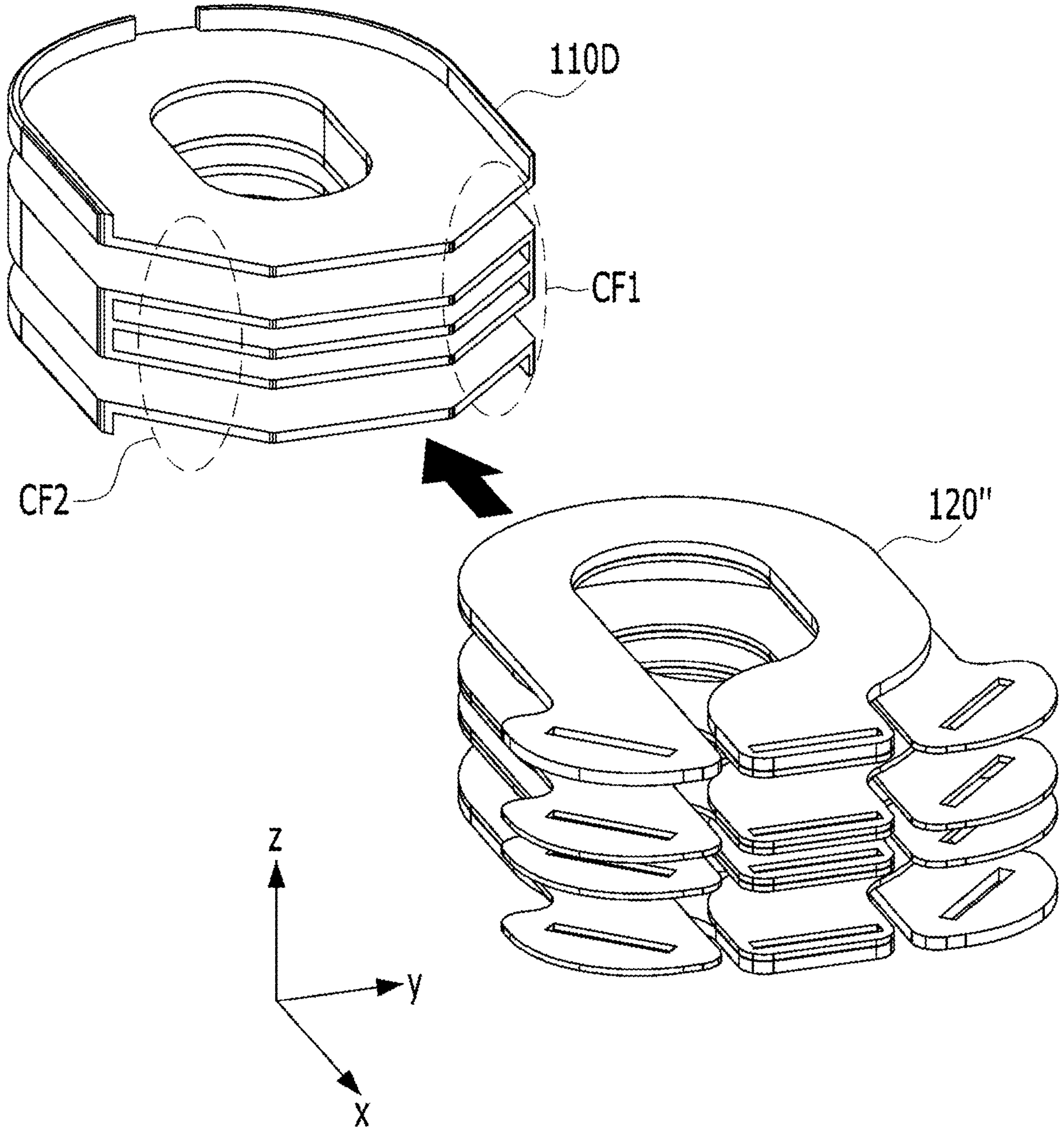
FIG. 16 is a perspective view showing an example of the construction of a bobbin and a secondary coil unit according to a further embodiment.

FIG. 15 is a plan view showing an example of the structure of a transformer according to a further embodiment, and FIG. 16 is a perspective view showing an example of the construction of a bobbin and a secondary coil unit according to a further embodiment.

Referring first to FIG. 15, the transformer 100D according to the further embodiment is similar to the transformers 100A, 100B, and 100C according to the above embodiments in terms of the stack structure of conductive plates and the distance between the conductive plates in the vertical direction. In the transformer 100D according to the further embodiment, however, a first type conductive plate 123 and a second type conductive plate 124 constituting the conductive plates 120" have different planar shapes.

For example, the first type conductive plate 123 according to the further embodiment may correspond to the 1-1 type conductive plate 121 and the 1-2 type conductive plate 121'. In addition, the second type conductive plate 124 according to the further embodiment may correspond to the 2-1 type conductive plate 122 and the 2-2 type conductive plate 122'. Consequently, the first type conductive plate 123 and the second type conductive plate 124 according to the further embodiment may have a first thickness or a second thickness greater than the first thickness depending on the stack position thereof in the vertical direction.

Specifically, a through hole H1 provided in a signal end 123_R of the first type conductive plate 123 and a through hole H2 provided in a signal end 124_L of the second type conductive plate 124 may be tilted in a plane in an extension direction thereof, compared to a through hole H provided in each of ground ends 123_M and 124_M. For example, the extension direction of each of the through hole H1 provided in the signal end 123_R of the first type conductive plate 123 and the through hole H2 provided in the signal end 124_L of the second type conductive plate 124 may form an obtuse angle with the extension direction of the through hole H provided in each of the ground ends 123_M and 124_M. In this case, as shown in FIG. 15, a deviation in planar distance (indicated by arrows) between the through hole H1 of one signal end 123_R and the portion of a corresponding conductive plate 123 forming a turn in the extension direction may be reduced. This means that current flow distances in the conductive plates are uniform and thus means that winding loss, eddy current loss, and leakage inductance are reduced. Consequently, overall efficiency of the transformer may be improved.

Meanwhile, since the extension direction of the through hole H1 or H2 provided in each signal end is tilted in a plane, compared to the through hole H provided in each ground end, the shape of the bobbin may be changed as shown in FIG. 16 so as to correspond thereto. Referring to FIG. 16, the bobbin 110D according to the further embodiment may have chamfered portions CF1 and CF2 at two corners of the other part opposite one part having a semicircular shape in a plane in the major-axis direction (e.g. the x-axis direction). At this time, the angle between each of the chamfered portions CF1 and CF2 and the minor-axis direction (i.e. the y-axis direction) of the bobbin 110C in the plane may correspond to the angle between the extension direction of the through hole H1 or H2 provided in each signal end and the extension direction of the through hole H provided in each ground end.

Although some embodiments have been described above, various other embodiments may be implemented. The technical contents of the above embodiments may be combined in various forms unless they are incompatible with each other, and a new embodiment may be implemented therethrough.

In addition, the transformer 100 according to the above embodiment may be mounted on an instrument transformer, an AC calculation panel, a DC-DC converter, a booster, or a step-down transformer.

It will be apparent to those skilled in the art that the disclosure may be embodied in specific forms other than those set forth herein without departing from the spirit and essential characteristics of the disclosure. Therefore, the above embodiments should be construed in all aspects as illustrative and not restrictive. The scope of the disclosure should be determined by the appended claims and their legal equivalents, and all changes falling within the meaning and equivalency range of the appended claims are intended to be embraced therein.

The invention claimed is:

1. A transformer comprising:

a bobbin;

a core unit disposed outside the bobbin, the core unit comprising an upper core having a first middle leg and a lower core having a second middle leg, the core unit having a gap between the first middle leg and the second middle leg; and a plurality of conductive plates inserted into the bobbin, the plurality of conductive plates constituting an upper coil unit, a middle coil unit, and a lower coil unit spaced apart from each other in a vertical direction, wherein the middle coil unit comprises a first middle coil unit and a second middle coil unit, wherein the gap is disposed between the first middle coil unit and the second middle coil unit, wherein each of the upper coil unit, the first middle coil unit, the second middle coil unit, and the lower coil unit comprises a first type conducive plate and a second type conductive plate stacked in the vertical direction, wherein the first type conducive plate and the second type conductive plate have left-right symmetrical planar shapes, and wherein an extension direction of a through hole disposed at a signal end of each of the first type conducive plate and the second type conductive plate forms a predetermined angle with an extension direction of a through hole disposed at a ground end of each of the first type conducive plate and the second type conductive plate.

2. The transformer according to claim 1, wherein each of the first middle coil unit and the second middle coil unit has a side shape disposed spaced apart from the gap in the vertical direction.

3. The transformer according to claim 1, wherein the bobbin has a middle receiving portion configured to receive the middle coil unit, and wherein the middle receiving portion comprises:

a first receiving hole configured to receive the first middle coil unit;

a second receiving hole configured to receive the second middle coil unit; and a partition disposed between the first receiving hole and the second receiving hole in the vertical direction, at least a portion of the partition overlapping the gap in a horizontal direction.

4. The transformer according to claim 1, wherein a size of the gap in the vertical direction is less than a distance between the first middle coil unit and the second middle coil unit in the vertical direction.

5. The transformer according to claim 1, wherein the predetermined angle comprises an obtuse angle.

6. The transformer according to claim 1, wherein a conductive plate disposed at an uppermost layer and a conductive plate disposed at a lowermost layer in the vertical direction, among the plurality of conductive plates, have a larger thickness than the other conductive plates.

7. A transformer comprising:

a bobbin;

a core unit disposed outside the bobbin, the core unit including an upper core having a first middle leg and a lower core having a second middle leg, the core unit having a gap between the first middle leg and the second middle leg; and a plurality of conductive plates inserted into the bobbin, the plurality of conductive plates constituting an upper coil unit, a middle coil unit, and a lower coil unit spaced apart from each other in a vertical direction, wherein at least one conductive plate of the middle coil unit adjacent to the gap has a larger thickness than the other conductive plates, wherein an uppermost conductive plate of the upper coil unit and a lowermost conductive plate of the lower coil unit have a larger thickness than the other conductive plates of the upper coil unit and the lower coil unit, wherein each of at least one conducive plate of the middle coil unit adjacent to the gap, the uppermost conductive plate of the upper coil unit, and the lowermost conductive plate of the lower coil unit has a second thickness greater than a first thickness of the other conductive plates.

8. The transformer according to claim 7, wherein the plurality of conductive plates is formed as a result of any one of a 1-1 type conductive plate having a first planar shape and the first thickness and a 1-2 type conductive plate having the first planar shape and the second thickness greater than the first thickness and any one of a 2-1 type conductive plate having a second planar shape and the first thickness and a 2-2 type conductive plate having the second planar shape and the second thickness being alternately stacked in the vertical direction.

9. The transformer according to claim 8, wherein the first planar shape and the second planar shape are left-right symmetrical.

10. The transformer according to claim 9, wherein an extension direction of a through hole disposed at a signal end of each of the conducive plate having the first planar shape and the conductive plate having the second planar shape forms a predetermined angle with an extension direction of a through hole disposed at a ground end of each of the conducive plate having the first planar shape and the conductive plate having the second planar shape.

11. The transformer according to claim 10, wherein the predetermined angle comprises an obtuse angle.

* * * * *